(12) United States Patent
Arima

(10) Patent No.: US 8,963,461 B2
(45) Date of Patent: Feb. 24, 2015

(54) MOTOR CONTROL DEVICE

(71) Applicant: Toshiba Schneider Inverter Corporation, Mie (JP)

(72) Inventor: Hiroki Arima, Mie (JP)

(73) Assignee: Toshiba Schneider Inverter Corporation, Mie-gun, Mie (JP)

( * ) Notice: Subject to any disclaimer, the term of this patent is extended or adjusted under 35 U.S.C. 154(b) by 28 days.

(21) Appl. No.: 13/949,439

(22) Filed: Jul. 24, 2013

(65) Prior Publication Data

US 2014/0028224 A1     Jan. 30, 2014

(30) Foreign Application Priority Data

Jul. 25, 2012   (JP) ................. 2012-164726

(51) Int. Cl.
*H02P 21/00*     (2006.01)
*H02P 21/14*     (2006.01)

(52) U.S. Cl.
CPC .......... *H02P 21/0096* (2013.01); *H02P 21/143* (2013.01); *H02P 21/0039* (2013.01)
USPC .................................................. 318/400.02

(58) Field of Classification Search
USPC ................................. 318/700, 400.01, 400.02
See application file for complete search history.

(56) References Cited

U.S. PATENT DOCUMENTS

| 6,069,467 A * | 5/2000 | Jansen ........................... 318/802 |
| 2009/0256518 A1* | 10/2009 | Kitanaka et al. .............. 318/802 |
| 2012/0306411 A1* | 12/2012 | Tadano ...................... 318/400.02 |
| 2013/0221885 A1* | 8/2013 | Hunter ...................... 318/400.15 |
| 2013/0345916 A1* | 12/2013 | Ozaki ............................. 701/22 |

FOREIGN PATENT DOCUMENTS

JP        2002-253000        9/2002

OTHER PUBLICATIONS

English Language Abstract and Translation for JP 2002-253000 published on Sep. 6, 2002.

\* cited by examiner

*Primary Examiner* — Bentsu Ro
*Assistant Examiner* — Zoheb Imtiaz
(74) *Attorney, Agent, or Firm* — DLA Piper LLP (US)

(57) ABSTRACT

A motor control device includes an inverter driving an electric motor, a vector controller determining an output frequency and a command output voltage to drive the inverter, a speed controller determining a torque command value, a current command calculation unit and an inertia moment estimation unit obtaining a load torque estimate value and estimating inertia moment that is a combination of inertia moment of a motor rotor and inertia moment of a load apparatus, based on a deviation between an acceleration/deceleration torque output value obtained by subtraction of the load torque estimation from motor torque and an acceleration/deceleration torque estimate value obtained by multiplying a variation amount in the speed estimate value per unit time by an inertia moment estimate value. The speed controller is configured to be capable of adjusting a control parameter based on an inertia moment estimate value estimated by the inertia moment estimation unit.

19 Claims, 10 Drawing Sheets

MOTOR CONTROL DEVICE

CROSS-REFERENCE TO RELATED APPLICATIONS

This application is based upon and claims the benefit of priority from the prior Japanese Patent Application No. 2012-164726 filed on Jul. 25, 2012, the entire contents of which are incorporated herein by reference.

FIELD

Embodiments described herein relate to an electric motor control device.

BACKGROUND

Induction motors are easily controllable and can be powered from commercial power supplies. Accordingly, the induction motors have widely been used to drive industrial machines in a vast range of industrial fields for a long period of time. A constant voltage/frequency (V/F) ratio control has conventionally been employed as a method of controlling the induction motors. This control method can provide an output voltage proportional to a frequency. Subsequently, a sensorless vector control has become widely used on demand for improvements in motor characteristics in low speed ranges, application of torque control and the like.

On the other hand, permanent magnet synchronous motors are free of no-load current and secondary copper loss and accordingly have a higher efficiency as compared with induction motors. Motors having saliency, such as interior permanent magnet synchronous motors, are controllable at a further higher efficiency by using reluctance torque. The sensorless vector control system has also been in widespread use with respect to the permanent magnet synchronous motors.

The sensorless vector control system is generally based on a vector control system with use of a speed sensor or a magnetic pole position sensor and uses an estimate value of speed or magnetic pole position instead of a signal generated by the sensor. In this case, a large number of types of sensorless vector control systems are provided with a speed controller to control a rotating speed of the motor. The speed controller is generally composed into a combination of a proportioning controller and an integrating controller. Optimization of control parameters of the proportional-integral control necessitates an inertia moment value of a load apparatus.

When control parameters of the speed controller are not optimum, for example, when a set value of the inertia moment is smaller than an actual inertia moment of the load apparatus, an undershoot or overshoot appears in the rotational speed of the motor in the case where the rotational speed is accelerated or decelerated in a relatively shorter time. An excessive degree of occurrence of undershoot or overshoot in the rotating speed causes overvoltage or a phenomenon that the motor is once reversed in rotation when it is decelerated to be stopped, or other phenomena. These abnormal states result in cases where the motor control device cannot meet the specifications thereof.

The control parameters of the speed controller need to be optimized in order that the above-described phenomena may be avoided. However, an entire rotating part cannot sometimes be confirmed from outside when inertia moment of the load apparatus is measured. Furthermore, the specification of the load apparatus or the like cannot be obtained even in many cases when it is tried to be obtained for calculation of inertia moment.

In view of the above-described circumstances, it is suggested that inertia moment of the load apparatus be estimated by the motor control device thereby to be used to optimize the control parameters of the speed controller. However, in order that the load apparatus may be driven, torque sufficient to oppose load torque caused with rotation of the load apparatus needs to be generated on a rotating shaft of the motor. Accordingly, the moment inertia can rarely be tuned in a completely unloaded condition in the motor control device but, rather, normally needs to be accurately estimated while some load torque is applied to the rotor shaft.

DETAILED DESCRIPTION

In general, according to one embodiment, a motor control device comprises an inverter which drives an electric motor, a vector controller, a speed control unit, a current command calculation unit and an inertia moment estimation unit. The vector controller converts a detection current of the motor on synchronous coordinate axes synchronized with an output frequency and estimates a rotating speed of a rotor of the motor on the synchronous coordinate axes, thereby determining an output frequency and further determining a command output voltage so that a current command value and a current detection value correspond with each other. The vector controller further converts the command output voltage to that on coordinate axes at rest and supplying the converted command output voltage to the inverter to drive the inverter. The speed control unit determines a torque command value so that a speed command value and a speed estimate value correspond with each other. The current command calculation unit calculates the current command value based on the torque command value and supplies the current command value to the vector controller. The inertia moment estimation unit obtains a load torque estimate value of a load apparatus connected to the motor rotor and estimates an inertia moment that is an addition of an inertia moment of the motor rotor and an inertia moment of the load apparatus, based on a deviation between an acceleration/deceleration torque output value obtained by subtraction of the load torque estimate value from a value of torque generated by the motor and an acceleration/deceleration torque estimate value obtained by multiplying an amount of variation of the speed estimate value per unit time by an inertia moment estimate value, in a state where the speed command value is varied by a predetermined speed width in a first one of directions of increase-decrease while the motor is driving by a speed command value not more than a rated rotational speed and the rotational speed of the motor, and the speed command value is varied by the predetermined speed width in a second direction opposite the first direction after lapse of a time for which the rotational speed of the motor settles, and after lapse of a time for which the rotational speed of the motor settles, variation of the speed command value is repeated so that the speed command value is re-varied in the first direction. The speed control unit is configured to be capable of adjusting a control parameter based on the inertia moment estimate value estimated by the inertia moment estimation unit.

Figure 1:
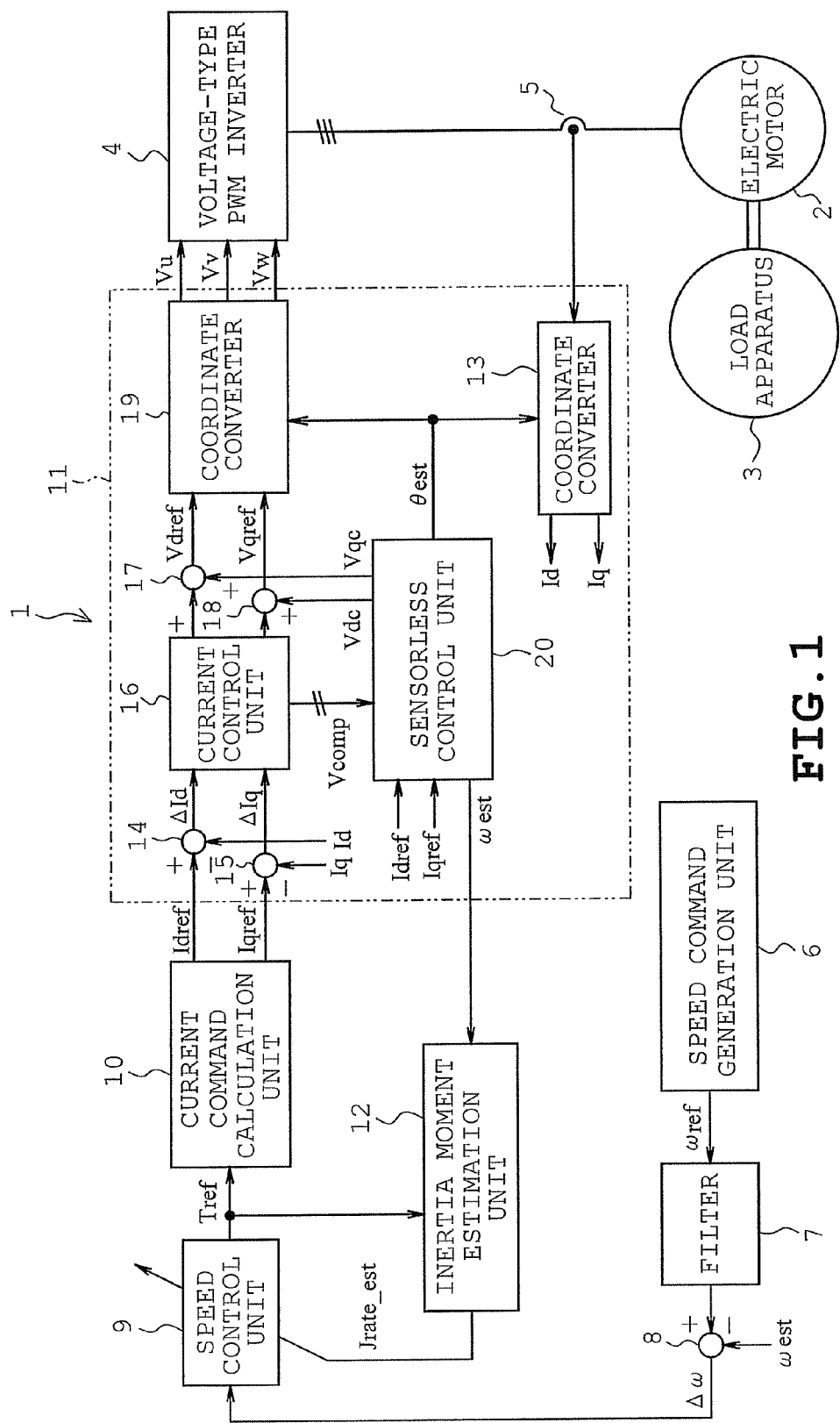
FIG. 1 is a block diagram showing the electrical arrangement of the motor control device of a first embodiment.

Several embodiments will be described with reference to the accompanying drawings. A first embodiment will now be described with reference to FIGS. 1 to 5. Referring first to FIG. 1, a motor control device 1 according to the first embodiment is shown. The motor control device 1 is configured to be capable of driving an electric motor 2 in a sensorless manner without provision of a speed sensor and a position sensor. The motor 2 is a three-phase induction motor or a three-phase permanent magnet synchronous motor. The motor 2 includes a rotor shaft to which a load apparatus 3 is connected via a transmission mechanism.

A voltage-type PWM inverter 4 is configured to generate AC voltage having a PWM waveform based on input voltage command values $V_u$, $V_v$ and $V_w$ to supply the AC voltage to the motor 2. A current detector 5 is constituted of a Hall element and the like and is configured to detect at least two phase motor currents. A control unit is constituted of a microcomputer and is configured to input a speed command value $\omega_{ref}$ and a current detection value and to supply voltage command values Vu, Vv and Vw.

Figure 3:
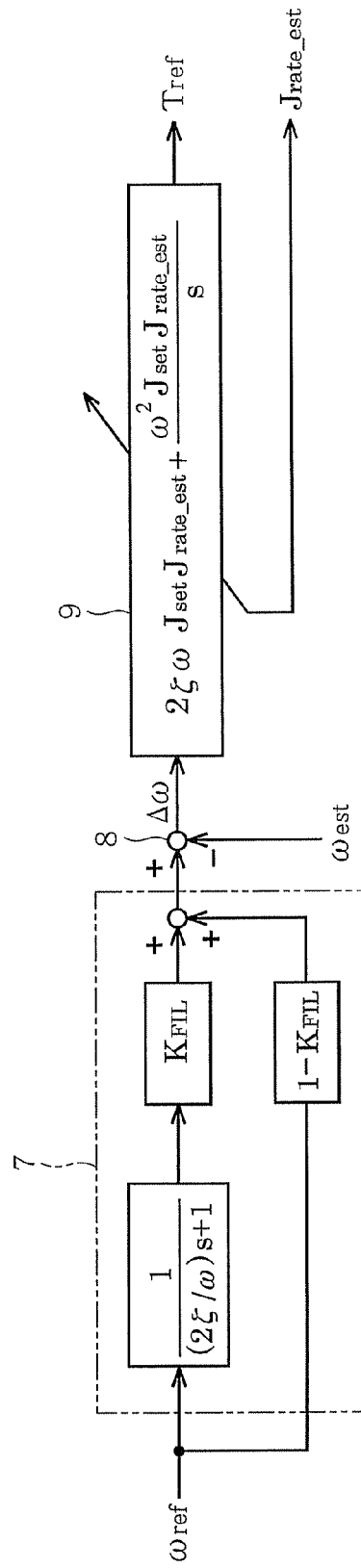
FIG. 3 is a block diagram showing a filter and a speed controller.
Figure 4:
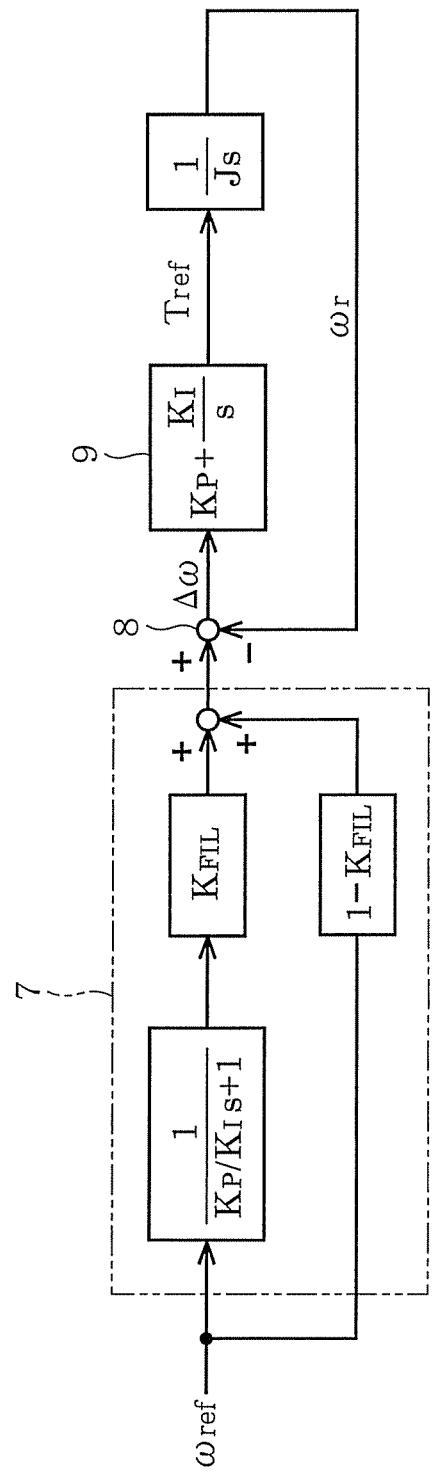
FIG. 4 is a schematic block diagram showing a model of speed control system.

Processes executed by the control unit in accordance with a control program can be shown as function blocks of a speed command generation unit 6, a filter 7, a subtractor 8, a speed control unit 9, a current command calculation unit 10, a vector controller 11 and an inertia moment estimation unit 12, as shown in FIG. 1. The speed command generation unit 6 is configured to generate a speed command value $\omega_{ref}$ according to a set state of an operation part (not shown), externally input signals, an operation mode (a control mode, an adjustment mode) and the like. The filter 7 serves as a first-order lag element as shown in FIGS. 3 and 4. The subtractor 8 is configured to subtract the speed estimate value $\omega_{est}$ from the speed command value $\omega_{ref}$ supplied from the filter 7, thereby supplying a speed deviation $\Delta\omega$.

The speed control unit 9 is configured for adjustment of a control parameter of a PI compensator, based on an inertia moment set error rate estimate value $J_{rate\_est}$ (hereinafter referred to as "error rate estimate value $J_{rate\_est}$") estimated by the inertia moment estimation unit 12. The speed control unit 9 is configured to determine a torque command value $T_{ref}$ so that the speed deviation 80 becomes zero. The current command calculation unit 10 is configured to calculate a d-axis current command value $I_{dref}$ and a q-axis current command value $I_{qref}$ based on the torque command value $T_{ref}$ and to supply these current command values to the vector controller 11.

The current detection value is supplied from the current detector 5 to the vector controller 11, and the d-axis and q-axis current command values $I_{dref}$ and $I_{qref}$ are supplied from the current command calculation unit 10 to the vector controller 11. The vector controller 11 supplies voltage command values Vu, Vv and Vw and a speed estimate value $\omega_{est}$. More specifically, the vector controller 11 is constituted of the following function blocks. An estimate phase angle $\theta_{est}$ of magnetic flux obtained by integration of an output frequency is supplied to the coordinate converter 13, which then executes a three-phase to two-phase conversion and a rotational coordinate conversion of a current detection value, calculating a d-axis current $I_d$ and a q-axis current $I_q$ on a synchronous coordinate axis used in the control unit. The subtractor 14 subtracts the d-axis current detection value $I_d$ from the d-axis current command value $I_{dref}$ thereby to obtain a d-axis current deviation $\Delta I_d$. The subtractor 15 subtracts the q-axis current detection value $I_q$ from the q-axis current command value $I_{qref}$ thereby to obtain a q-axis current deviation $\Delta I_q$.

A current control unit 16 executes a proportional-integral (PI) operation so that the current deviations $\Delta I_d$ and $\Delta I_q$ become zero, thereby generating output voltage compensation values. Reference symbol "$V_{comp}$" designates an integral term of d-axis and q-axis regarding current control. The current control unit 16 supplies the d-axis and q-axis voltage compensation values to the adders 17 and 18 respectively. The Adders 17 and 18 add the d-axis and q-axis voltage compensation values to d-axis and q-axis voltages $V_{dc}$ and $V_{qc}$ respectively. The d-axis and q-axis voltages $V_{dc}$ and $V_{qc}$ will be described in detail later. As a result, the adders 17 and 18 generate d-axis and q-axis voltage command values $V_{dref}$ and $V_{qref}$ respectively. A coordinate converter 19 is configured to convert the voltage command values $V_{dref}$ and $V_{qref}$ both generated on the synchronous coordinate axes to those on three-phase coordinate axes at rest.

A sensorless control unit 20 is configured to estimate by operation a rotational speed of a rotor of the motor 2 on the synchronous coordinate axes based on the d-axis integral term and the q-axis integral term in the above-described current control. The sensorless control unit 20 integrates the obtained speed estimate value $\omega_{est}$ to obtain an estimate phase angle $\theta_{est}$ serving as information about magnetic flux phase. Furthermore, the sensorless control unit 20 enters the d-axis current command value $I_{dref}$ and the q-axis current command value $I_{qref}$ to calculate a d-axis voltage $V_{dc}$ and a q-axis voltage $V_{qc}$ both serving as feedforward terms.

In order that the control gain (the control parameter) of the speed control unit 9 may be optimized, an inertia moment estimation unit 12 is configured to estimate inertia moment J that is a combination of inertia moment of the rotor of the motor 2 and inertia moment of the load apparatus 3. When the load apparatus 3 includes a gear mechanism, the inertia moment of the load apparatus 3 is a value converted to the rotor shaft.

An inertia moment $J_{set}$ of the rotor of the standard motor 2 driven by the motor control device 1 is set in the speed control unit 9 and the inertia moment estimation unit 12. The inertia moment estimation unit 12 calculates the error rate estimate value $J_{rate\_est}$ that is a rate of inertia moment J to be estimated and the preset inertia moment $J_{set}$, as shown in equation (1). Since the inertia moment set value $J_{set}$ is a predetermined value, the inertia moment estimation unit 12 substantially estimates the inertia moment J:

$$J_{rate\_est} = J/J_{set} \qquad (1)$$

Figure 2:
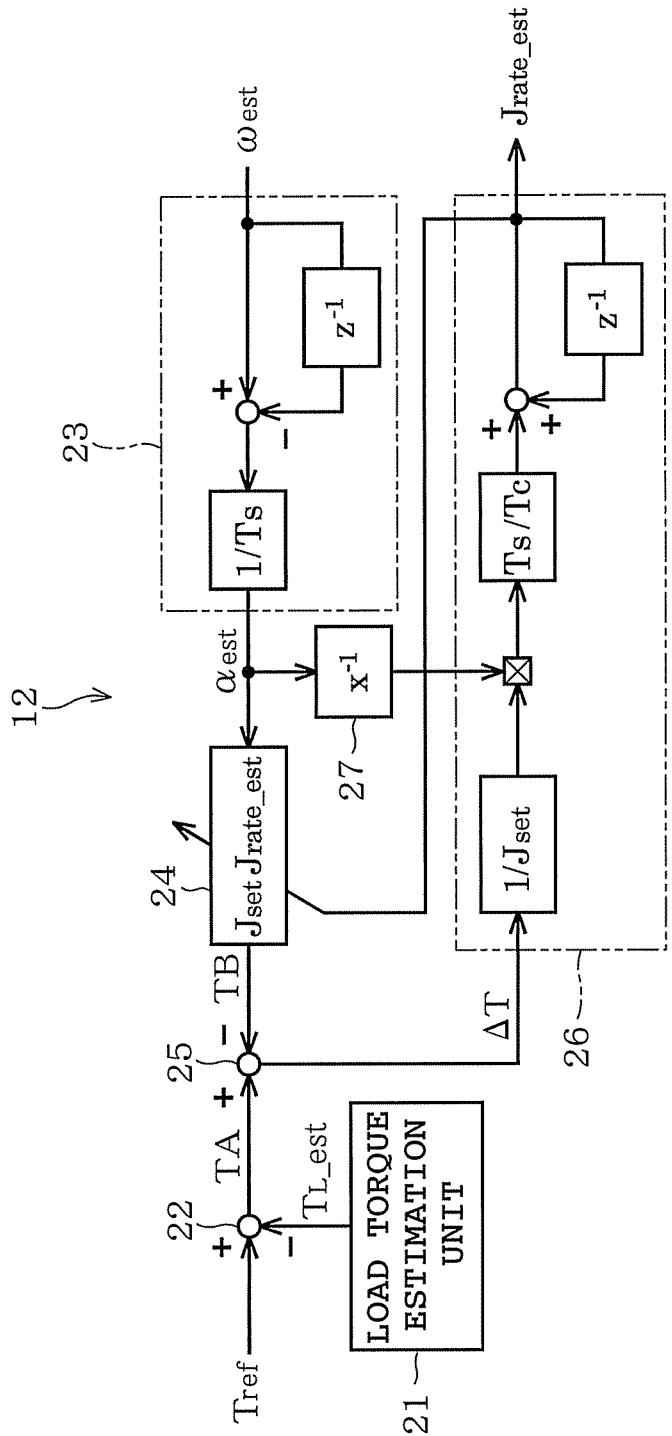
FIG. 2 is a block diagram showing an inertia moment estimation unit.

FIG. 2 shows concrete function blocks by which the inertia moment estimation unit 12 calculates the error rate estimate value $J_{rate\_est}$. The inertia moment estimation unit 12 includes a load torque estimation unit 21 which estimates torque of the load apparatus 3 to supply a load torque estimate value $T_{L\_est}$. The inertia moment estimation unit 12 is configured to set as the load torque estimate value $T_{L\_est}$ a value obtained by averaging torque command value $T_{ref}$, a value obtained by averaging torque estimate value $T_{est}$ calculated on the basis of a d-axis current detection value $I_d$ and a q-axis current detection value $I_q$ or a torque value estimated from viscous friction and coulomb friction of the load apparatus 3 as will be described in a fifth embodiment later.

The inertia moment estimation unit 12 uses a torque command value $T_{ref}$ determined by the speed control unit 9 as a torque value delivered from the motor 2. The subtractor 22 is configured to subtract a load torque estimate value $T_{L\_est}$ from the torque command value $T_{ref}$ determined by the speed control unit 9, thereby obtaining an acceleration/deceleration torque output value TA. The acceleration/deceleration torque output value TA is the torque contributing to acceleration/deceleration.

A differentiator 23 is configured to divide by a discrete system control period $T_s$ the difference between speed estimate values $\omega_{est}$ of last and current control periods, thereby obtaining a speed differential value $\alpha_{est}$. The speed differential value $\alpha_{est}$ is an amount of variation of the speed estimate value $\omega_{est}$ per unit time. A multiplier 24 is configured to multiply the differential value $\alpha_{est}$ by an inertia moment J ($=J_{set} \times J_{rate\_est}$) that will be estimated as follows, thereby obtaining an acceleration/deceleration estimate value TB. The acceleration/deceleration estimate value TB is a torque estimate value contributing to acceleration/deceleration.

In the case where the acceleration/deceleration torque output value TA serves as a reference model and the acceleration/deceleration estimate value TB serves as an adaptive model, the inertia moment estimation unit 12 executes convergent operation with respect to the error rate estimate value $J_{rate\_est}$ used in the adaptive model, based on the difference between the acceleration/deceleration torque output value TA and the acceleration/deceleration estimate value TB. More specifically, a subtractor 25 subtracts the acceleration/deceleration estimate value TB from the acceleration/deceleration torque output value TA, thereby obtaining an acceleration/deceleration torque difference $\Delta T$. An error rate estimation unit 26 is configured to divide the difference $\Delta T$ by the inertia moment set value $J_{set}$ and then to multiply the result of division by $1/\alpha_{est}$ obtained by a reciprocal unit 27 (that is, to divide the result of division by $\alpha_{est}$), thereby obtaining a dimensionless value. Subsequently, the error rate estimation unit 26 multiplies the dimensionless value by Ts/Tc (where Tc is an integration time constant) and performs integration thereby to obtain the error rate estimate value $J_{rate\_est}$.

The setting of a control gain of the speed control unit 9 will now be described with reference to FIGS. 3 and 4. As described above, the current control unit 16 is configured to control the current so that current command values $I_{dref}$ and $I_{qref}$ and current detection values $I_d$ and $I_q$ correspond with each other respectively. A cutoff frequency of the current control unit 16 is generally set so as to be sufficiently higher than a cutoff frequency of the speed control unit 9. As a result, the torque command value $T_{ref}$ and actual torque T can be treated as corresponding with each other and accordingly, a model of the speed control system can be considered as shown in FIG. 4. When reference symbol $\omega_r$ designates an actual rotational speed of the motor 2, a transfer function of the speed control system is shown by the following equation (2):

$$\frac{\omega_r}{\omega_{ref}} = \frac{(1 - K_{FIL})\frac{K_P}{K_I}s + 1}{\frac{J}{K_I}s^2 + \frac{K_P}{K_I}s + 1} \tag{2}$$

When the term $K_{FIL}$ is set to 1 so that the speed control system can be treated as a general secondary system, the transfer function of the speed control system is shown by the following equation (3) and the numerator of the transfer function is 1:

$$\frac{\omega_r}{\omega_{ref}} = \frac{1}{\frac{J}{K_I}s^2 + \frac{K_P}{K_I}s + 1} = \frac{1}{\frac{1}{\omega^2}s^2 + \frac{2\zeta}{\omega}s + 1} \tag{3}$$

When the reference symbol $\zeta$ designates a damping factor, $\omega$ a natural angular frequency and the proportional gain KP and integral gain KI are set as equations (4) and (5) respectively, the speed control system can be treated in an easier manner as a normal secondary system response:

$$KP = 2\zeta\omega J \tag{4}$$

$$KI = \omega^2 J \tag{5}$$

When equation (1) is rewritten, the whole inertia moment J obtained by combining the inertia moment of the rotor of the motor 2 and the inertia moment of the load apparatus 3 is shown as equation (6) using a predetermined moment $J_{set}$ and an estimated error rate estimate value $J_{rate\_est}$:

$$J = J_{set} J_{rate\_est} \tag{6}$$

According to equations (4) to (6), the control gain KP and the integration gain KI set in the speed control unit 9 can be optimized as equations (7) and (8). As well known, a critical attenuation is obtained when attenuation coefficient $\zeta$ is set to 1:

$$KP = 2\zeta\omega J_{set} J_{rate\_est} \tag{7}$$

$$KI = \omega^2 J_{set} J_{rate\_est} \tag{8}$$

Accordingly, the control gain (KP+KI/s) can be optimized by multiplying the error rate estimate value $J_{rate\_est}$ obtained by the inertia moment estimation unit 12 by the inertia moment $J_{set}$ set in the speed control unit 9, as shown in FIG. 3.

Figure 5:
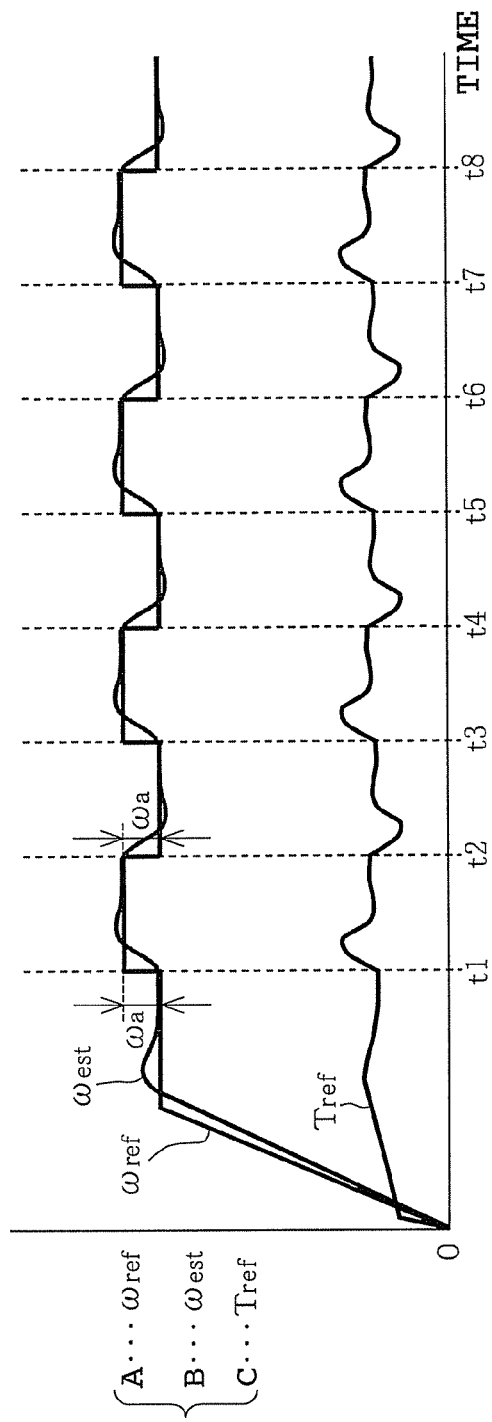
FIG. 5 is a waveform diagram in the case where a function of adjusting designation of the inertia moment and a function of adjusting control gain have been selected.

FIG. 5 shows waveform changes of the speed command value $\omega_{ref}$, the speed estimate value $\omega_{est}$ and the torque command value $T_{ref}$ in the case where the inertia moment and control gain adjusting function has been selected. The speed command generation unit 6 changes the speed command value $\omega_{ref}$ for the purpose of generating acceleration until the adjustment of inertia moment and control gain is completed. More specifically, the speed command generation unit 6 firstly accelerates the motor 2 to a predetermined speed command value set at or below a rated speed and then proceeds to the steady operation. Subsequently, the speed command generation unit 6 varies the speed command value $\omega_{ref}$ by a predetermined speed width $\omega_a$ in the direction of increase (a first direction) at time $t_1$. The speed command generation unit 6 further varies the speed command value $\omega_{ref}$ by the speed width $\omega_a$ in the direction of decrease (a first direction) at time $t_2$ after lapse of a stabilization time of the speed estimate value $\omega_{est}$ of the motor 2. The speed command generation unit 6 still further varies the speed command value $\omega_{ref}$ by the speed width $\omega_a$ in the direction of increase (a second direction) at time $t_3$ after lapse of the stabilization time of the speed estimate value $\omega_{est}$ of the motor 2. The speed command generation unit 6 subsequently repeats the variations of the speed command value $\omega_{ref}$ at times $t_4$, $t_5$, . . . .

The inertia moment estimation unit 12 executes calculation of the error rate estimate value $J_{rate\_est}$ (that is, estimation of inertia moment J) and optimization of control gain of the speed control unit 9 in a condition where the speed command value $\omega_{ref}$ is thus varied. Thus, setting error information of the inertia moment can be rendered easier to obtain by repeatedly generating acceleration.

The convergence operation is terminated, for example, upon expiration of a predetermined adjustment time. In many cases, the previously set inertia moment $J_{set}$ is smaller than the combined inertia moment of the inertia moment of the motor 2 and the inertia moment of the load apparatus 3. In this case, the error rate estimate value $J_{rate\_est}$ is adjusted in the direction of increase. Overshoot and undershoot of the speed estimate value $\omega_{est}$ are decreased with this adjustment. Conditions for termination of the conversion operation may be the fact that the overshoot and undershoot have been reduced to or below predetermined values respectively.

In the motor control device 1 according to the embodiment, the acceleration/deceleration torque output value TA is obtained by subtracting the load torque estimate value $T_{L\_est}$ from the torque command value $T_{ref}$. The acceleration/deceleration torque estimate value TB is obtained by multiplying the differential value $\alpha_{est}$ of the speed estimate value $\omega_{est}$ by the inertia moment estimate value J. The error rate estimate value $J_{rate\_est}$ (that is, an inertia moment J) is estimated so that the deviation between the values TA and TB is converged to zero. According to this estimation manner, the inertia moment can accurately be estimated even when torque is generated in the load apparatus 3. Furthermore, since the load apparatus 3 need not be reverse rotated, the estimation manner can be applied to the case where reverse rotation is disallowed.

The speed control unit 9 is configured to adjust the control parameter based on the inertia moment estimate value J thereby to optimize the control constant. Consequently, when the speed command has been varied, the speed responsibility can be improved while preventing overshoot and undershoot of the rotating speed. Furthermore, the occurrence of overvoltage and the reverse rotation in the case where the motor 2 is decelerated to be stopped can be prevented. Thus, the motor control device 1 can correct the control parameter of the speed control unit 9 thereby to optimize the speed response even when the inertia moment of the load apparatus 3 is unknown.

Figure 6:
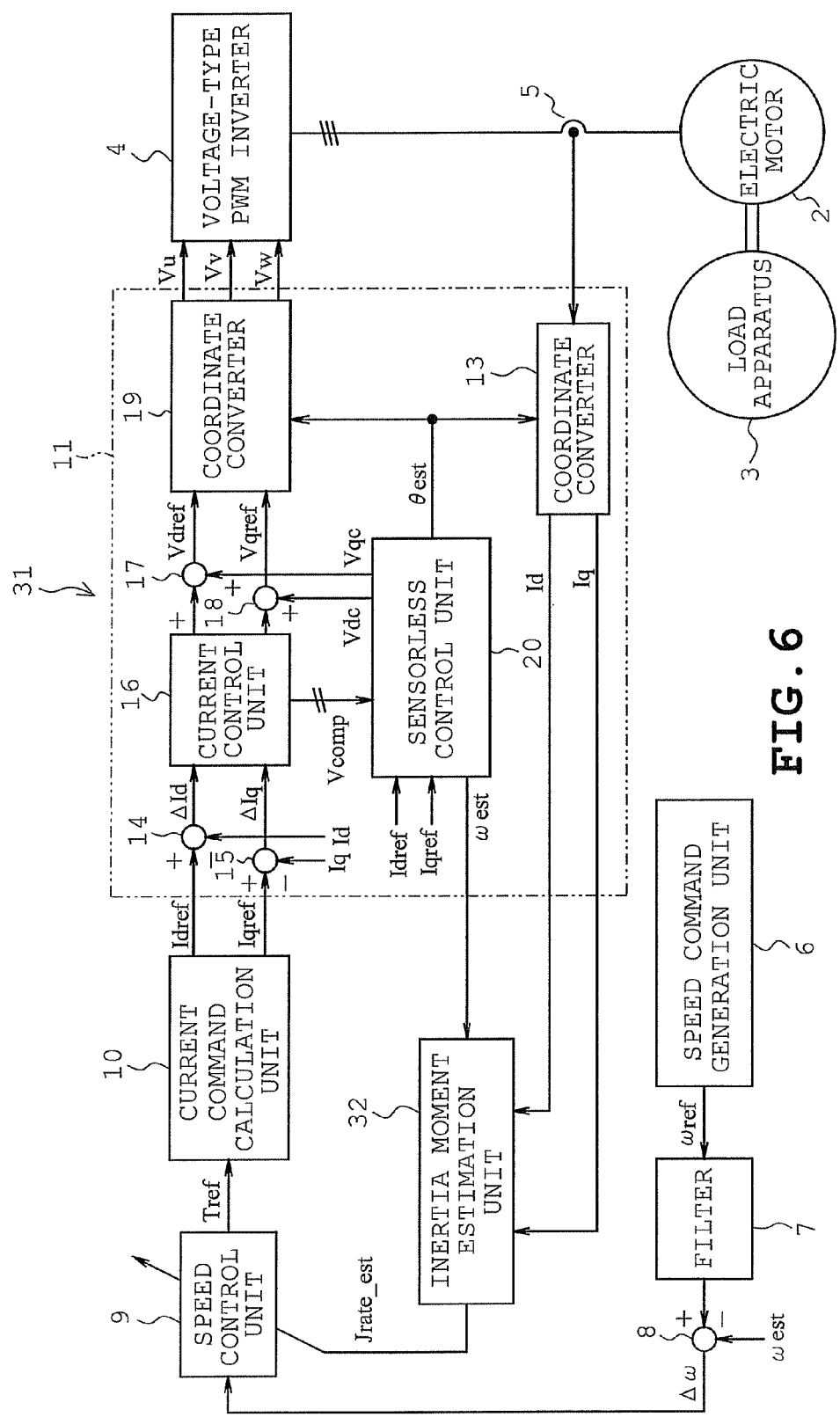
FIG. 6 is a block diagram showing the electrical arrangement of the motor control device of a second embodiment.
Figure 7:
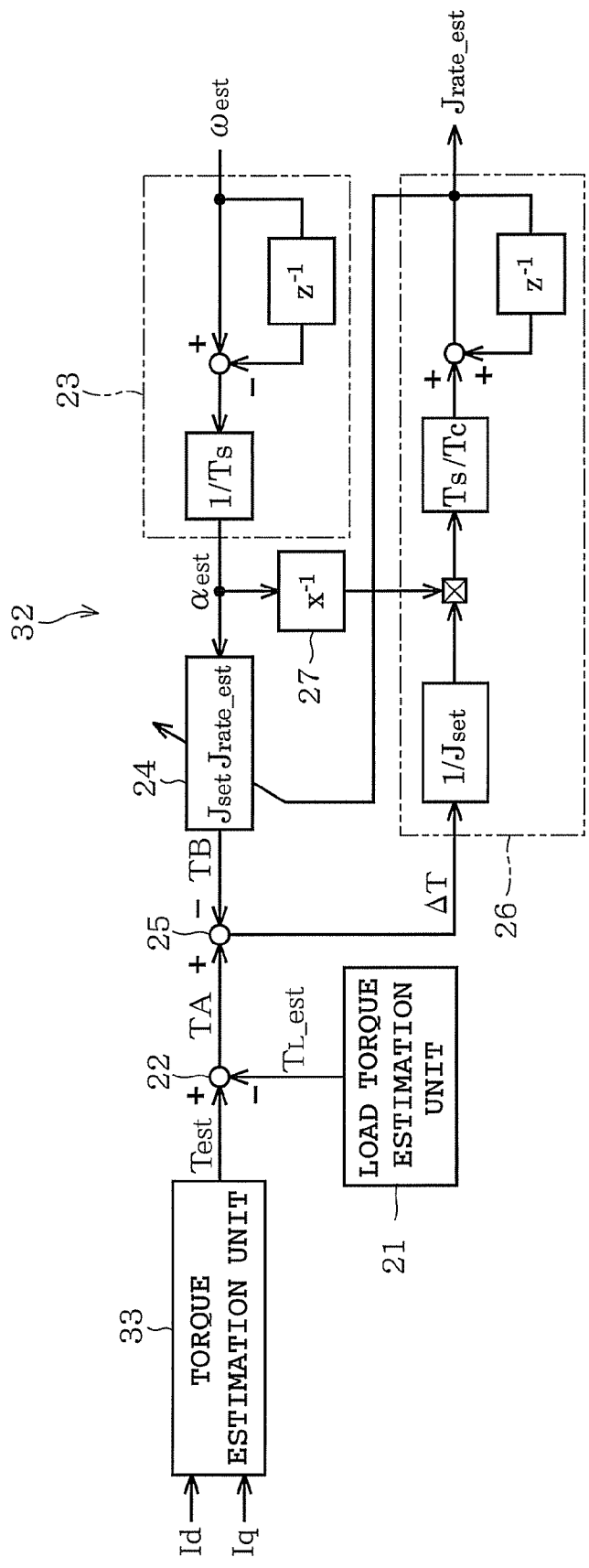
FIG. 7 is a block diagram showing an electrical arrangement of the inertia moment estimation unit.

FIGS. 6 and 7 illustrate a second embodiment. The motor control device 31 has the same configuration as the motor control device 1 of the first embodiment except for the inertia moment estimation unit 32. The inertia moment estimation unit 32 includes a torque estimation unit 33 which estimates a torque value $T_{est}$ generated by the motor 2 by operation using the d-axis current detection value $I_d$ and the q-axis current detection value $I_q$. The subtractor 22 is configured to subtract a load torque estimate value $T_{L\_est}$ from the torque estimate value $T_{est}$, thereby obtaining the acceleration/deceleration torque output value TA. As described above, the acceleration/deceleration torque output value TA contributes to acceleration/deceleration. The other part of the configuration of the inertia moment estimation unit 32 is the same as that of the inertia moment estimation unit 12. The second embodiment can achieve the same operation and advantageous effects as those of the first embodiment.

Figure 8:
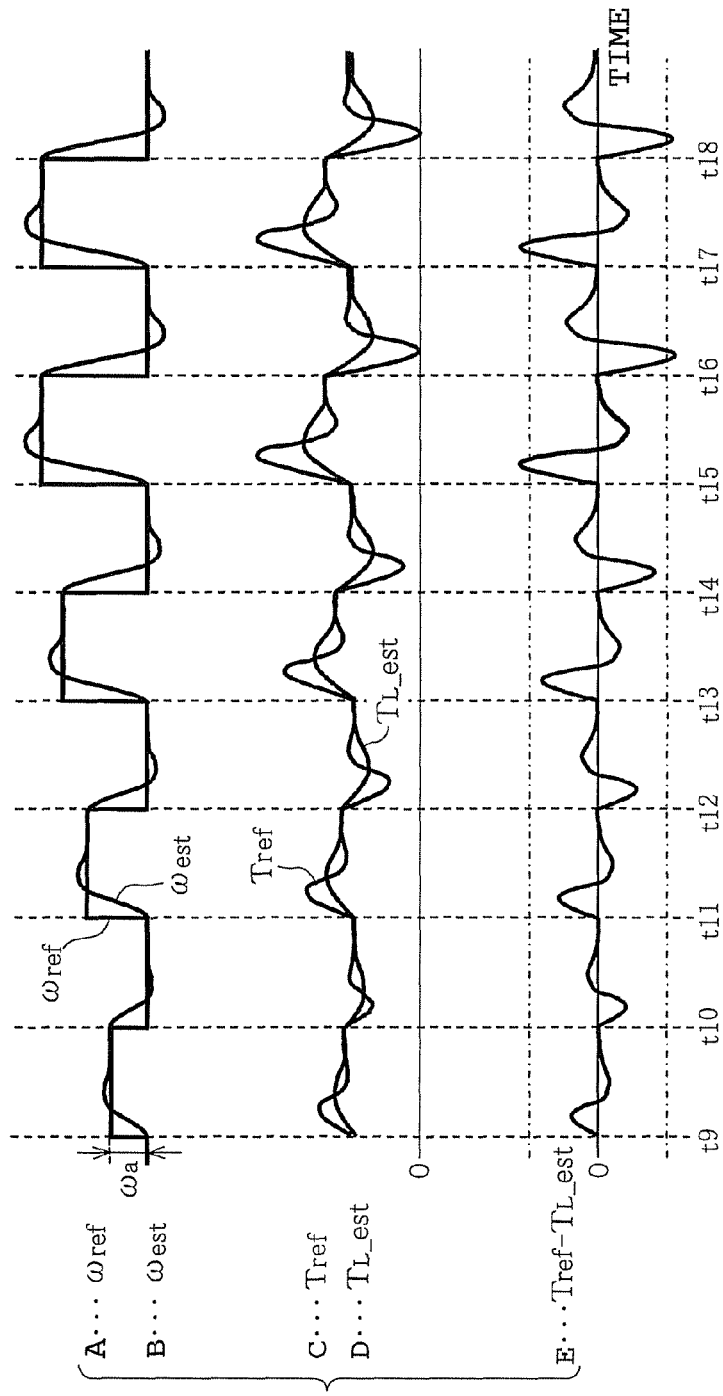
FIG. 8 is a waveform diagram in the case where a function of adjusting designation of the inertia moment and a function of adjusting control gain have been selected, showing a third embodiment.

FIG. 8 illustrates a third embodiment. When the inertia moment and control gain adjusting function have been selected, the speed command generation unit 6 (see FIGS. 1 and 6) repeatedly increases and decreases the speed command value $\omega_{ref}$ when every stabilization time of the speed estimate value $\omega_{est}$ elapses (see FIG. 5). An initial increase rate and an initial decrease rate upon start of increase and decrease are equal to the speed width $\omega_a$.

The speed command generation unit 6 gradually increases an increase/decrease speed width until an amount of change per unit time of the acceleration/deceleration torque output value TA or the acceleration/deceleration torque estimate value TB becomes equal to or larger than a predetermined value (as shown by an alternate long and short line in FIG. 8). After the speed variation width of the speed command value $\omega_{ref}$ has been adjusted (at or after time $t_{17}$), the inertia moment estimation unit 12 or 32 (see FIG. 2 or 7) starts a convergent calculation of the error rate estimate value $J_{rate\_est}$. The other configuration of the motor control device is the same as that of first or second embodiment. According to the third embodiment, the inertia moment can be estimated in the state where sufficiently large acceleration/deceleration torque has been generated. Consequently, the convergent calculation of the error rate estimate value $J_{rate\_est}$ can be executed with high accuracy.

Figure 9:
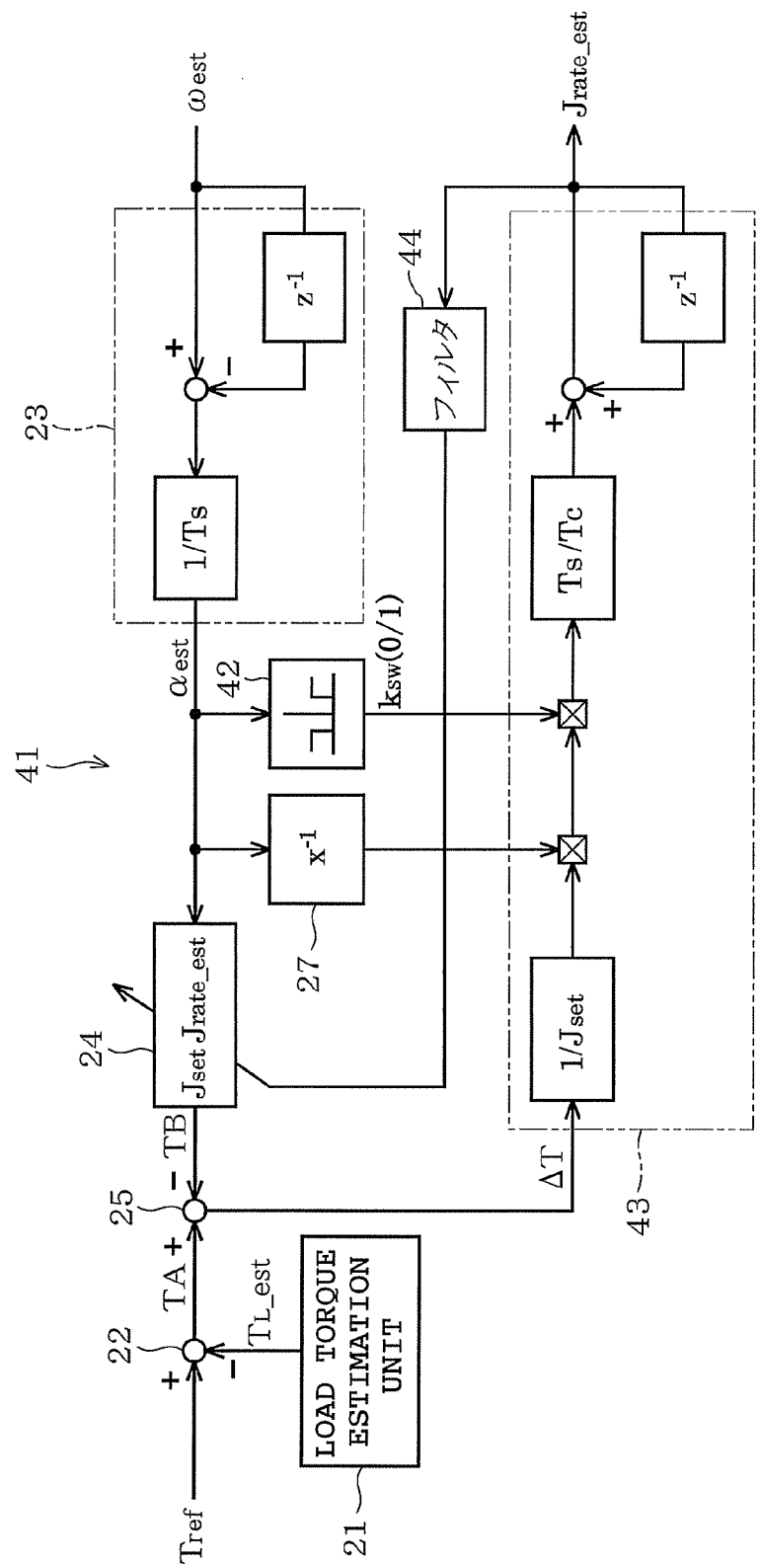
FIG. 9 is a block diagram showing the inertia moment estimation unit in a fourth embodiment.

FIG. 9 illustrates a fourth embodiment. The inertia moment estimation unit 41 includes a switch 42 which generates a factor $k_{sw}$ that becomes 0 when the absolute figure of the speed differential value $\alpha_{est}$ is less than a threshold $\alpha_{th}$ and that becomes 1 when the absolute figure of the speed differential value $\alpha_{est}$ is equal to or larger than the threshold $\alpha_{th}$. The error rate estimation unit 43 divides acceleration/deceleration torque difference $\Delta T$ by the inertia moment set value $J_{set}$ and then multiplies an obtained value by $1/\alpha_{est}$ and the factor $k_{sw}$. The error rate estimation unit 43 further performs integration thereby to obtain the error rate estimate value $J_{rate\_est}$. The error rate estimate value $J_{rate\_est}$ is supplied via the filter 44 to the multiplier 24. The filter 44 may be eliminated. The other configuration of the inertia moment estimation unit 41 is the same as that of the inertia moment estimation unit 12 in the first embodiment.

The inertia moment estimation unit 41 stops estimation of the error rate estimate value $J_{rate\_est}$ during a period when an amount of variation of speed estimate value $\omega_{est}$ per unit time (the absolute value of speed differential value $\alpha_{est}$) is less than a predetermined threshold $\alpha_{th}$, maintaining the error rate estimate value $J_{rate\_est}$ estimated immediately before the stop period. When the speed variation rate is small, both acceleration/deceleration torque output value TA and acceleration/deceleration torque estimate value TB also become smaller. Accordingly, there is a possibility that an error would be increased when the convergent calculation is continued. According to the fourth embodiment, however, the convergent calculation is stopped in the period when the acceleration/deceleration torque becomes smaller. Consequently, an increase in the error of the error rate estimate value $J_{rate\_est}$ can be prevented.

Figure 10:
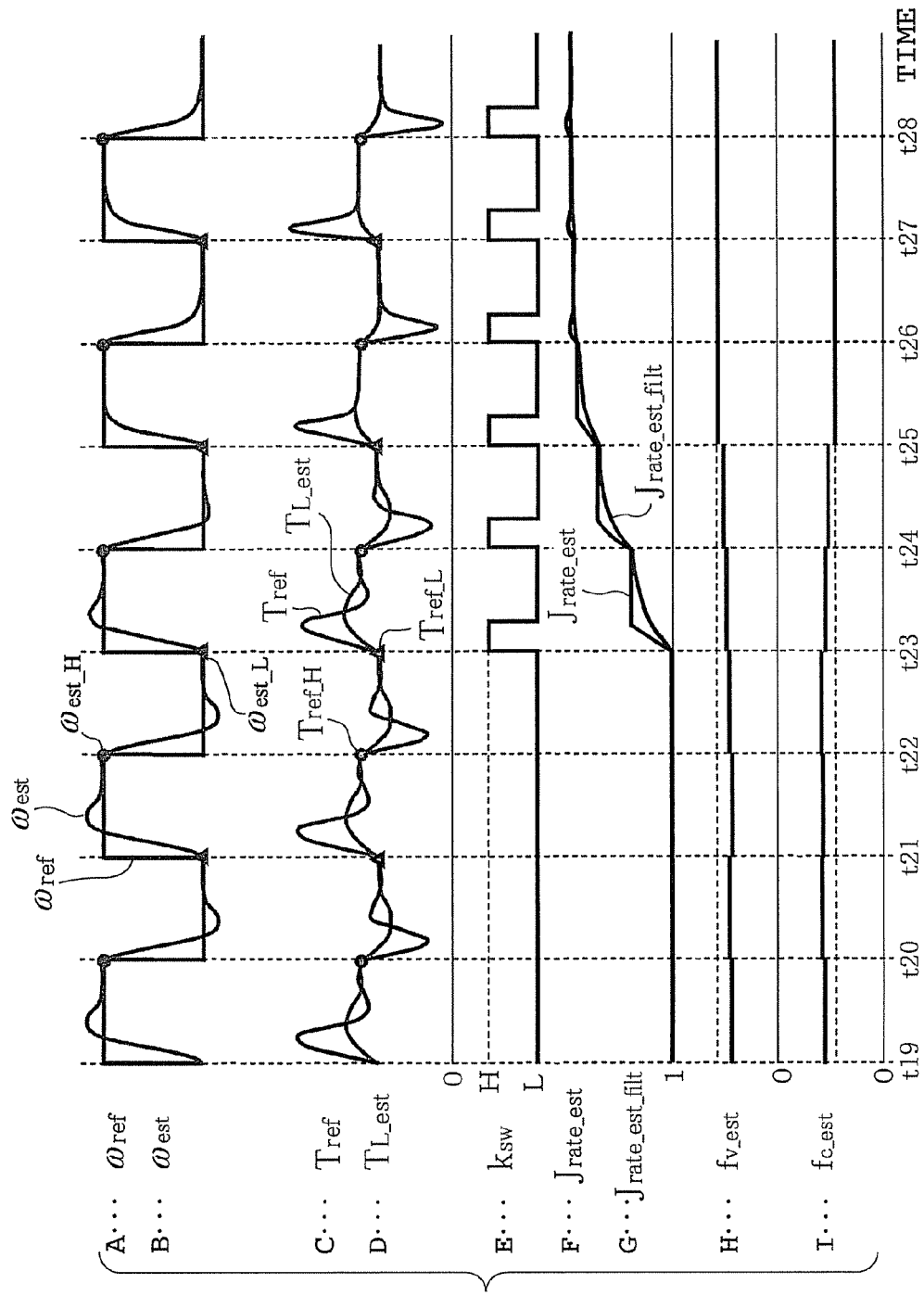
FIG. 10 is a waveform diagram in the case where a function of adjusting designation of the inertia moment and a function of adjusting control gain have been selected, showing a fifth embodiment.

FIG. 10 illustrates a fifth embodiment, which is directed to the load torque estimation unit 21. Although the fifth embodiment is applied to the fourth embodiment, it may also be applicable to the first to third embodiments.

The load torque estimation unit 21 approximates the torque estimate value $T_{L\_est}$ as a sum of torque $T_{v\_est}$ due to viscous friction and torque $T_{c\_est}$ due to coulomb friction, as shown in equation (9)

$$T_{L\_est}=T_{v\_est}+T_{c\_est} \qquad (9)$$

The torque $T_{v\_est}$ due to viscous friction and the torque $T_{c\_est}$ due to coulomb friction are shown by the following equations (10) and (11) respectively:

$$T_{v\_est} = \omega_{est} \cdot f_{v\_est} \tag{10}$$

$$T_{c\_est} = \text{sign}(\omega_{est}) \cdot f_{c\_est} \tag{11}$$

where $f_{v\_est}$ is a viscous friction coefficient, $f_{c\_est}$ is a coulomb friction coefficient and sign is a sign function.

FIG. 10 is a waveform chart showing a process of estimating an error rate estimate value $J_{rate\_est}$ executed at or after time t18 as depicted in FIG. 8. The waveforms include, sequentially from the top, a speed command value $\omega_{ref}$ and a speed estimate value $\omega_{est}$, a torque command value $T_{ref}$ and a torque estimate value $T_{L\_est}$ of the load apparatus 3, a coefficient $k_{sw}$, an error rate estimate value $J_{rate\_est}$ and an error rate estimate value $J_{rate\_est\_filt}$ after having been filtered, a viscous friction coefficient $f_{v\_est}$, and a coulomb friction coefficient $f_{c\_est}$.

Assume now that symbol $\omega_{est\_H}$ designates a speed estimate value immediately before the speed command generation unit 6 varies the speed command value $\omega_{ref}$ in the direction of reduction (a first direction), symbol $T_{ref\_H}$ designates a torque command value immediately before the speed command generation unit 6 varies the speed command value $\omega_{ref}$ in the direction of reduction (a first direction), symbol $\omega_{est\_L}$ designates a speed estimate value immediately before the speed command generation unit 6 varies the speed command value $\omega_{ref}$ in the direction of increase (a second direction) and symbol $T_{ref\_L}$ designates a torque command value immediately before the speed command generation unit 6 varies the speed command value $\omega_{ref}$ in the direction of increase (a second direction). The load torque estimation unit 21 estimates a viscous friction coefficient $f_{v\_est}$ and a coulomb friction coefficient $f_{c\_est}$ based on equations (12) and (13):

$$f_{v\_est} = (T_{ref\_H} - T_{ref\_L})/(\omega_{est\_H} - \omega_{est\_L}) \tag{12}$$

$$f_{c\_est} = (T_{ref\_H} \cdot \omega_{est\_L} - T_{ref\_L} \cdot \omega_{est\_H})/(-\omega_{est\_H} + \omega_{est\_L}) \tag{13}$$

Assume that symbol $T_{est\_H}$ designates a torque estimate value the speed command generation unit 6 calculates based on a d-axis current detection value $I_d$ and a q-axis current detection value $I_q$ immediately before varying the speed command value $\omega_{ref}$ in the direction of decrease. Also assume that symbol $T_{est\_L}$ designates a torque estimate value the speed command generation unit 6 calculates based on a d-axis current detection value $I_d$ and a q-axis current detection value $I_q$ immediately before varying the speed command value $\omega_{ref}$ in the direction of increase. The load torque estimation unit 21 may estimate a viscous friction coefficient $f_{v\_est}$ and a coulomb friction coefficient $f_{c\_est}$ based on equations (14) and (15) instead of the equations (12) and (13):

$$f_{v\_est} = (T_{est\_H} - T_{est\_L})/(\omega_{est\_H} - \omega_{est\_L}) \tag{14}$$

$$f_{c\_est} = (T_{est\_H} \cdot \omega_{est\_L} - T_{est\_L} \cdot \omega_{est\_H})/(-\omega_{est\_H} + \omega_{est\_L}) \tag{15}$$

When the inertia moment adjusting function and the control gain adjusting function are selected and the speed command generation unit 6 starts increase/decrease of a speed command value $\omega_{ref}$, the load torque estimation unit 21 also starts an estimating calculation of a viscous friction coefficient $f_{v\_est}$ and a coulomb friction coefficient $f_{c\_est}$. For example, in a period between time $t_{23}$ and time $t_{24}$, the load torque estimation unit 21 estimates a viscous friction coefficient $f_{v\_est}$ and a coulomb friction coefficient $f_{c\_est}$ using a speed estimate value $\omega_{est}$ H and a torque command value $T_{ref\_H}$ both obtained at time $t_{22}$ and a speed estimate value $\omega_{est\_L}$ and a torque command value $T_{ref\_L}$ both obtained at time $t_{23}$. The load torque estimation unit 21 calculates a torque estimate value $T_{L\_est}$ using a result of the aforementioned estimation. The inertia moment estimation unit 41 executes convergence calculation of an error rate estimate value $J_{rate\_est}$ only in the period when the coefficient $k_{sw}$ is at the H level.

The motor control device according to the embodiment can estimate the load torque even when load torque of the load apparatus 3 is unknown. The motor control device can also estimate an error rate estimate value $J_{rate\_est}$, that is, inertia moment using the obtained load torque estimate value $T_{L\_est}$. Consequently, an estimation accuracy of inertia moment can be improved. The fifth embodiment can also achieve the same advantageous effects as those achieved by the first to fourth embodiments.

The following modified forms may also be employed in addition to the above-described embodiments. The switch 42 and a filter 44 may be added to the inertia moment estimation unit 32 as described in the second embodiment, in the same manner as in the fourth embodiment. The configuration of the motor control device as described in the fourth embodiment may be applied to the third embodiment. Thus, the above-described embodiments and modified forms which will be described in the following may be combined unless the combination results in technical inconsistency.

The reciprocal units 27 of the inertia moment estimation units 12, 32 and 41 may be eliminated in the respective embodiments. The inertia moment estimation units 12, 32 and 41 should not be limited to the respective configurations described above so far as the inertia moment estimation units 12, 32 and 41 are configured to generate an error rate estimate value $J_{rate\_est}$ according to acceleration/deceleration torque difference $\Delta T$.

In the fourth and fifth embodiments, a compensator as shown by the following equation (16) may be provided instead of the reciprocal unit 27 and the switch 42:

$$\alpha_{est\_mod} = \alpha_{est}/(1 + \alpha_{est}^2) \tag{16}$$

An output value $\alpha_{est\_mod}$ of the compensator is substantially equal to reciprocal $1/\alpha_{est}$ in a range of the speed differential value $\alpha_{est}$ equal to or larger than a predetermined threshold and is also substantially equal to $\alpha_{est}$ in a range of the speed differential value $\alpha_{est}$ less than the threshold. When convergent calculation of error rate estimate value $J_{rate\_est}$ using the compensator, the estimate gain by which the acceleration/deceleration torque difference $\Delta T$ is multiplied is reduced more as the speed differential value $\alpha_{est}$ becomes small, in a range of the speed differential value $\alpha_{est}$ less than the threshold, that is, in a range of reduction in the acceleration/deceleration torque. This can obtain an effect of preventing an increase in the error of the error rate estimate value $J_{rate\_est}$. The provision of the above-described compensator can also be applied to the first to third embodiments. For example, the compensator as shown by equation (16) may also be provided in the error rate estimation unit 26, instead of the reciprocal unit 27.

According to the above-described embodiment, the inertia moment that is a combination of the inertia moment of the rotor of the motor 2 and the inertia moment of the load apparatus 3 can accurately be estimated even when torque is generated in the load apparatus 3. Velocity response can be optimized since the speed control unit 9 adjusts a control parameter based on an inertia moment estimate value.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A motor control device comprising:
an inverter which drives an electric motor;
a vector controller which converts a detection current of the motor on synchronous coordinate axes synchronized with an output frequency and estimates a rotating speed of a rotor of the motor on the synchronous coordinate axes, thereby determining an output frequency and further determining a command output voltage so that a current command value and a current detection value correspond with each other, the vector controller converting the command output voltage to that on coordinate axes at rest and supplying the converted command output voltage to the inverter to drive the inverter;
a speed control unit which determines a torque command value so that a speed command value and a speed estimate value estimated by the vector control unit correspond with each other;
a current command calculation unit which calculates the current command value based on the torque command value and supplies the current command value to the vector controller; and
an inertia moment estimation unit which obtains a load torque estimate value of a load apparatus connected to the motor rotor and estimates an inertia moment that is an addition of an inertia moment of the motor rotor and an inertia moment of the load apparatus, based on a deviation between an acceleration/deceleration torque output value obtained by subtraction of the load torque estimate value from a value of torque generated by the motor and an acceleration/deceleration torque estimate value obtained by multiplying an amount of variation of the speed estimate value per unit time by an inertia moment estimate value, in a state where the speed command value is varied by a predetermined speed width in a first one of directions of increase-decrease while the motor is driving by a speed command value not more than a rated rotational speed and the rotational speed of the motor, and the speed command value is varied by the predetermined speed width in a second direction opposite the first direction after lapse of a time for which the rotational speed of the motor settles, and after lapse of a time for which the rotational speed of the motor settles, variation of the speed command value is repeated so that the speed command value is re-varied in the first direction,
wherein the speed control unit is configured to be capable of adjusting a control parameter based on the inertia moment estimate value estimated by the inertia moment estimation unit.

2. The motor control device according to claim 1, wherein the inertia moment estimation unit estimates the inertia moment in a state where a speed variation width of the speed command value has been adjusted so that an amount of variation per unit time in the acceleration/deceleration torque output value or the acceleration/deceleration torque estimate value becomes equal to or larger than a predetermined value.

3. The motor control device according to claim 2, wherein the inertia moment estimation unit employs as the load torque estimate value a value obtained by averaging the torque command value or by averaging the torque estimate value calculated based on the current detection value.

4. The motor control device according to claim 2, wherein the inertia moment estimation unit uses the torque command value as the value of torque generated by the motor, and the inertia moment estimation unit approximates torque of the load apparatus by a sum of torque $T_{v\_est}$ due to viscous friction and torque $T_{c\_est}$ due to coulomb friction, estimating the torque $T_{v\_est}$ and the torque $T_{c\_est}$ using speed estimate values $\omega_{est\_H}$ and $\omega_{est\_L}$ obtained immediately before variation of the speed command value in the first and second directions respectively and torque command values $T_{ref\_H}$ and $T_{ref\_L}$ obtained immediately before variation of the speed command value in the first and second directions respectively.

5. The motor control device according to claim 4, wherein the inertia moment estimation unit estimates the load torque estimate value $T_{L\_est}$ by equations:

$$T_{L\_est} = T_{v\_est} + T_{c\_est}$$

$$T_{v\_est} = \omega_{est} \cdot f_{v\_est}$$

$$T_{c\_est} = \text{sign}(\omega_{est}) \cdot f_{c\_est}$$

$$f_{v\_est} = (T_{ref\_H} - T_{ref\_L})/(\omega_{est\_H} - \omega_{est\_L})$$

$$f_{c\_est} = (T_{ref\_H} \cdot \omega_{est\_L} - T_{ref\_L} \cdot \omega_{est\_H})/(-\omega_{est\_H} + \omega_{est\_L})$$

where sign is a sign function, $\omega_{est}$ is the speed estimate value, $f_{v\_est}$ is a coefficient of viscous friction and $f_{c\_est}$ is a coefficient of coulomb friction.

6. The motor control device according to claim 2, wherein the inertia moment estimation unit uses as the value of torque generated by the motor a torque estimate value calculated based on the current detection value, and the inertia moment estimation unit approximates torque of the load apparatus by a sum of torque $T_{v\_est}$ due to viscous friction and torque $T_{c\_est}$ due to coulomb friction, estimating the torque $T_{v\_est}$ and the torque $T_{c\_est}$ using speed estimate values $\omega_{est\_H}$ and $\omega_{est\_L}$ obtained immediately before variation of the speed command value in the first and second directions respectively and torque estimate values $T_{est\_H}$ and $T_{est\_L}$ calculated based on the current detection value obtained immediately before variation of the speed command value in the first and second directions respectively.

7. The motor control device according to claim 6, wherein the inertia moment estimation unit estimates the load torque estimate value $T_{L\_est}$ by equations:

$$T_{L\_est} = T_{v\_est} + T_{c\_est}$$

$$T_{v\_est} = \omega_{est} \cdot f_{v\_est}$$

$$T_{c\_est} = \text{sign}(\omega_{est}) \cdot f_{c\_est}$$

$$f_{v\_est} = (T_{est\_H} - T_{est\_L})/(\omega_{est\_H} - \omega_{est\_L})$$

$$f_{c\_est} = (T_{est\_H} \cdot \omega_{est\_L} - T_{est\_L} \cdot \omega_{est\_H})/(-\omega_{est\_H} + \omega_{est\_L})$$

where sign is a sign function, $\omega_{est}$ is the speed estimate value, $f_{v\_est}$ is a coefficient of viscous friction and $f_{c\_est}$ is a coefficient of coulomb friction.

8. The motor control device according to claim 1, wherein the inertia moment estimation unit estimates the inertia moment in a condition where the speed variation width of the speed command value is adjusted so that an amount of variation per unit time in the acceleration/deceleration torque output value or the acceleration/deceleration torque estimate value becomes equal to or larger than a predetermined value, the inertia moment estimation unit stopping the inertia moment estimating operation and maintaining an inertia moment estimate value estimated during a period when an amount of variation in the speed estimate value per unit time is less than a predetermined threshold, the inertia moment estimate value being estimated before the period.

9. The motor control device according to claim 8, wherein the inertia moment estimation unit employs as the load torque estimate value a value obtained by averaging the torque command value or by averaging the torque estimate value calculated based on the current detection value.

10. The motor control device according to claim 8, wherein the inertia moment estimation unit uses the torque command value as the value of torque generated by the motor, and the inertia moment estimation unit approximates torque of the load apparatus by a sum of torque $T_{v\_est}$ due to viscous friction and torque $T_{c\_est}$ due to coulomb friction, estimating the torque $T_{v\_est}$ and the torque $T_{c\_est}$ using speed estimate values $\omega_{est\_H}$ and $\omega_{est\_L}$ obtained immediately before variation of the speed command value in the first and second directions respectively and torque command values $T_{ref\_H}$ and $T_{ref\_L}$ obtained immediately before the variation of the speed command value in the first and second directions respectively.

11. The motor control device according to claim 10, wherein the inertia moment estimation unit estimates the load torque estimate value $T_{L\_est}$ by equations:

$$T_{L\_est} = T_{v\_est} + T_{c\_est}$$

$$T_{v\_est} = \omega_{est} \cdot f_{v\_est}$$

$$T_{c\_est} = \text{sign}(\omega_{est}) \cdot f_{c\_est}$$

$$f_{v\_est} = (T_{ref\_H} - T_{ref\_L})/(\omega_{est\_H} - \omega_{est\_L})$$

$$f_{c\_est} = (T_{ref\_H} \cdot \omega_{est\_L} - T_{ref\_L} \cdot \omega_{est\_H})/(-\omega_{est\_H} + \omega_{est\_L})$$

where sign is a sign function, $\omega_{est}$ is the speed estimate value, $f_{v\_est}$ is a coefficient of viscous friction and $f_{c\_est}$ is a coefficient of coulomb friction.

12. The motor control device according to claim 8, wherein the inertia moment estimation unit uses as the value of torque generated by the motor a torque estimate value calculated based on the current detection value, and the inertia moment estimation unit approximates torque of the load apparatus by a sum of torque $T_{v\_est}$ due to viscous friction and torque $T_{c\_est}$ due to coulomb friction, estimating the torque $T_{v\_est}$ and the torque $T_{c\_est}$ using speed estimate values $\omega_{est\_H}$ and $\omega_{est\_L}$ obtained immediately before variation of the speed command value in the first and second directions respectively and torque estimate values $T_{est\_H}$ and $T_{est\_L}$ calculated based on the detection current value obtained immediately before the variation of the speed command value in the first and second directions respectively.

13. The motor control device according to claim 12, wherein the inertia moment estimation unit estimates the load torque estimate value $T_{L\_est}$ by equations:

$$T_{L\_est} = T_{v\_est} + T_{c\_est}$$

$$T_{v\_est} = \omega_{est} \cdot f_{v\_est}$$

$$T_{c\_est} = \text{sign}(\omega_{est}) \cdot f_{c\_est}$$

$$f_{v\_est} = (T_{est\_H} - T_{est\_L})/(\omega_{est\_H} - \omega_{est\_L})$$

$$f_{c\_est} = (T_{est\_H} \cdot \omega_{est\_L} - T_{est\_L} \cdot \omega_{est\_H})/(-\omega_{est\_H} + \omega_{est\_L})$$

where sign is a sign function, $\omega_{est}$ is the speed estimate value, $f_{v\_est}$ is a coefficient of viscous friction and $f_{c\_est}$ is a coefficient of coulomb friction.

14. The motor control device according to claim 1, wherein the inertia moment estimation unit estimates the inertia moment in a condition where the speed variation width of the speed command value is adjusted so that an amount of variation per unit time in the acceleration/deceleration torque output value or the acceleration/deceleration torque estimate value becomes equal to or larger than a predetermined value, the inertia moment estimation unit reducing an estimate gain of the inertia moment based on the deviation between the acceleration/deceleration torque output value and the acceleration/deceleration torque estimate value as the amount of variation per unit time in the speed estimate value is small, within a range that the amount of variation per unit time in the speed estimate value is less than the predetermined threshold.

15. The motor control device according to claim 14, wherein the inertia moment estimation unit employs as the load torque estimate value a value obtained by averaging the torque command value or by averaging a torque estimate value calculated based on the current detection value.

16. The motor control device according to claim 14, wherein the inertia moment estimation unit uses the torque command value as the value of torque generated by the motor, and the inertia moment estimation unit approximates torque of the load apparatus by a sum of torque $T_{v\_est}$ due to viscous friction and torque $T_{c\_est}$ due to coulomb friction, estimating the torque $T_{v\_est}$ and the torque $T_{c\_est}$ using speed estimate values $\omega_{est\_H}$ and $\omega_{est\_L}$ obtained immediately before variation of the speed command value in the first and second directions respectively and torque command values $T_{ref\_H}$ and $T_{ref\_L}$ obtained immediately before variation of the speed command value in the first and second directions respectively.

17. The motor control device according to claim 16, wherein the inertia moment estimation unit estimates the load torque estimate value $T_{L\_est}$ by equations:

$$T_{L\_est} = T_{v\_est} + T_{c\_est}$$

$$T_{v\_est} = \omega_{est} \cdot f_{v\_est}$$

$$T_{c\_est} = \text{sign}(\omega_{est}) \cdot f_{c\_est}$$

$$f_{v\_est} = (T_{ref\_H} - T_{ref\_L})/(\omega_{est\_H} - \omega_{est\_L})$$

$$f_{c\_est} = (T_{ref\_H} \cdot \omega_{est\_L} - T_{ref\_L} \cdot \omega_{est\_H})/(-\omega_{est\_H} + \omega_{est\_L})$$

where sign is a sign function, $\omega_{est}$ is the speed estimate value, $f_{v\_est}$ is a coefficient of viscous friction and $f_{c\_est}$ is a coefficient of coulomb friction.

18. The motor control device according to claim 14, wherein the inertia moment estimation unit uses as a value of torque generated by the motor a torque estimate value calculated based on the detection current value, and the inertia moment estimation unit approximates torque of the load apparatus by a sum of torque $T_{v\_est}$ due to viscous friction and torque $T_{c\_est}$ due to coulomb friction, estimating the torque $T_{v\_est}$ and the torque $T_{c\_est}$ using speed estimate values $\omega_{est\_H}$ and $\omega_{est\_L}$ obtained immediately before variation of the speed command value in the first and second directions respectively and torque estimate values $T_{est\_H}$ and $T_{est\_L}$ calculated based on the current detection value obtained immediately before variation of the speed command value in the first and second directions respectively.

19. The motor control device according to claim 18, wherein the inertia moment estimation unit estimates the load torque estimate value $T_{L\_est}$ by equations:

$$T_{L\_est} = T_{v\_est} + T_{c\_est}$$

$$T_{v\_est} = \omega_{est} \cdot f_{v\_est}$$

$$T_{c\_est} = \text{sign}(\omega_{est}) \cdot f_{c\_est}$$

$$f_{v\_est} = (T_{est\_H} - T_{est\_L})/(\omega_{est\_H} - \omega_{est\_L})$$

$$f_{c\_est} = (T_{est\_H} \cdot \omega_{est\_L} - T_{est\_L} \cdot \omega_{est\_H})/(-\omega_{est\_H} + \omega_{est\_L}) \quad 5$$

where sign is a sign function, $\omega_{est}$ is the speed estimate value, $f_{v\_est}$ is a coefficient of viscous friction and $f_{c\_est}$ is a coefficient of coulomb friction.

* * * * *